United States Patent [19]
Neher

[11] Patent Number: 5,565,631
[45] Date of Patent: Oct. 15, 1996

[54] NON-METALLIC FLOW METER FLOAT AND METHOD

[75] Inventor: Norman T. Neher, Eagen, Minn.

[73] Assignee: The Futurestar Corporation, Edina, Minn.

[21] Appl. No.: 385,141

[22] Filed: Feb. 7, 1995

[51] Int. Cl.⁶ .................................................. G01F 1/22
[52] U.S. Cl. ..................................... 73/861.57; 73/861.55
[58] Field of Search .......................... 73/861.47, 861.55, 73/861.57, 861.62

[56] References Cited

U.S. PATENT DOCUMENTS

| | | | |
|---|---|---|---|
| 1,864,430 | 6/1932 | Griffith | 73/861.57 |
| 2,258,023 | 10/1941 | McKernon | 73/209 |
| 2,350,343 | 6/1944 | Fischer | 73/861.57 |
| 2,370,643 | 3/1945 | Erland et al. | 62/5 |
| 2,800,019 | 7/1957 | Rumble | 73/861.57 |
| 3,751,971 | 8/1973 | Wilcox | 73/37.9 |
| 3,974,857 | 8/1976 | Hehl | 137/559 |
| 4,250,745 | 2/1981 | Blatter et al. | 73/118 |
| 4,317,376 | 3/1982 | Fitzpatrick | 73/861.55 |
| 4,503,712 | 3/1985 | Vigneaux | 73/861.35 |
| 4,559,834 | 12/1985 | Phillips et al. | 73/861.55 |
| 4,875,364 | 10/1989 | Levine et al. | 73/61.72 |
| 5,174,161 | 12/1992 | Veneruso et al. | 73/861.58 |
| 5,186,058 | 2/1993 | Lew | 73/861.56 |

FOREIGN PATENT DOCUMENTS 867008  2/1953  Germany ........................... 73/861.57

*Primary Examiner*—Richard Chilcot
*Assistant Examiner*—Max Noori
*Attorney, Agent, or Firm*—Nawrocki, Rooney & Sivertson, P.A.

[57] ABSTRACT

A float mountable on a guide rod in a flow meter site tube including a non-metallic body having a generally cylindrical portion and a generally hemispherical portion. The hemispherical portion forms a leading end of the body opposite a tailing end of the body. The trailing end of the body may be boat tail shaped. A method is providing for substituting a non-metallic float for a metallic float within a given flow meter site tube configuration to measure approximately the same flow rate as the metallic float. Another method is provided for substituting different floats within a given site tube configuration to measure different flow rates.

3 Claims, 4 Drawing Sheets

NON-METALLIC FLOW METER FLOAT AND METHOD

BACKGROUND OF THE INVENTION

The present invention generally pertains to the field of flow meters, and in particular to flow meter floats for rotameters.

The regulation and metering of fluid flows are essential process steps performed in industry. For example, different caustic and corrosive acids are utilized in the manufacture of various integrated circuit devices. It can be particularly important to know quantities of the different acids transferred, and consequently, measuring and controlling flow rate can be critical to the quality of a finished product.

A widely used type of meter for these applications is a variable area flow meter or rotameter which includes a generally vertically oriented site tube. The inside diameter of the site tube varies with vertical position within the tube. The smaller inside diameter is generally proximate the flow inlet at the lower end of the tube. The inside diameter generally increases upwardly through the tube toward the flow outlet.

A "float" is placed within the tube. The float rises and descends within the tube relative to increases and decreases in flow rate of fluid through the tube respectively. The term "float" is actually a misnomer because the float is in fact more dense than the fluid and thus does not float. The float appears to float, however, due to the drag created by the upward force of the fluid flowing through the tube.

Rotameters often include a valve to control the flow rate into the site tube. Thus, the rotameter may be used to regulate the flow to a specific rate and/or measure flow over a range of flow rates.

When a rotameter is used to measure the flow of corrosive fluids, it may be desirable to use a meter containing no metallic parts, including the float. If a flow meter is equipped with a float including a metal portion, it may be desirable to replace it with an entirely non-metallic float. Additionally, it may be desirable at times to increase or decrease the range of flow rates which a rotameter having a given site tube can measure.

SUMMARY OF THE INVENTION

The present invention pertains to an improved non-metallic float which may be used to measure flows of corrosive or other fluids. A method is provided for substituting a non-metallic float for a metallic float in a given rotameter site tube to measure the same flow rate or flow rate ranges as the metallic float. Another method is provided to substitute a first float for a second float in order to measure different flow rates or flow rate ranges with a given rotameter site tube.

The float in accordance with the present invention can be mounted on a guide rod in a flow meter site tube. The float includes a non-metallic body having a generally cylindrical portion and a generally hemispherical portion. The hemispherical portion forms a leading end of the body opposite a trailing end of the body. The hemispherical portion can have a diameter approximately equal to the diameter of the latitudinal cross section of the cylindrical portion of the body.

The trailing end of the body may have a boat tailed shape. The body is preferably made from the non-metallic material polytetraflouroethylene (PTFE), but may be made from other non-metallic materials appropriate to the particular characteristics of the fluid to be metered. To mount the float on the guide rod, the body can include a guide rod opening extending from the leading end to the trailing end of the body.

In accordance with the present invention, a method is provided for substituting a non-metallic float for a metallic float within a given flow meter site tube to measure approximately the same flow rate as the metallic float. The method includes the steps of forming a non-metallic body having a generally cylindrical portion and a generally hemispherical portion. The hemispherical portion forms a leading end of the body portion opposite a trailing end of the body.

The weight of the non-metallic float is adjusted by adjusting the dimensions of the non-metallic float such that when the non-metallic float is substituted for the metallic float, the non-metallic float measures approximately the same flow rate as the metallic float. The measurement is made by the non-metallic float rising to approximately the same level in the site tube as the metallic float does at that flow rate.

The non-metallic float may be made to measure approximately the same flow rate range as the metallic float. In this case, each flow rate within the range is measured by the non-metallic float rising to approximately the same level in the site tube as the metallic float does at that flow rate.

The float may also be configured to reduce drag acting on the float as fluid flows by it within the site tube. The drag on the float may be increased or reduced by increasing or reducing the diameter of the float respectively. Boat tailing the trailing end of the float can also reduce drag.

In accordance with the present invention, another method is provided for substituting different floats within a given site tube to measure different flow rates. In this case, similar steps are made to vary the weight of the float or the drag on the float as mentioned above with respect to the method for substituting a non-metallic float for a metallic float. With this method, however, when a second float is substituted for a first float, a different flow rate will be measured when the second float attains the same height as the first float does in a given site tube.

DETAILED DESCRIPTION OF THE INVENTION

Figure 1:
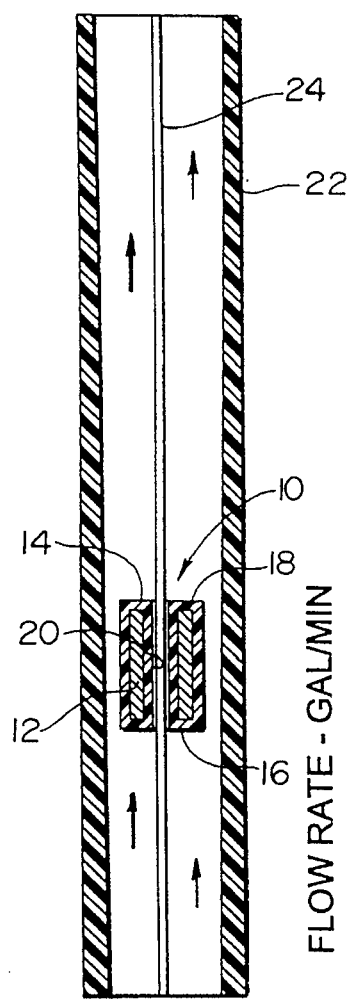
FIG. 1 is a vertical cross sectional view of a prior art metallic float mounted on a guide rod within a site tube.

Referring now to the drawings wherein like reference numerals refer to like elements throughout the several views, FIG. 1 shows a prior art float generally referred to by the numeral 10. Float 10 includes a cylindrical body having an annular metallic core 12 surrounded by a non-metallic shell 14. Float 10 has a leading end 16 at one end of the cylindrical body and a trailing end 18 at the opposite end of the cylindrical body. A guide rod opening 20 extends through the cylindrical body from leading end 16 to trailing end 18.

As known in the art, float 10 may be placed in a rotameter site tube 22. The float may be mounted for vertical movement along a guide rod 24 extending longitudinally through site tube 22 and guide rod opening 20 of float 10. Float 10, site tube 22 and guide rod 24 are well known components of variable area flow meters or rotameters. The term "float" is actually a misnomer, however, because it is denser than the fluid and does not float, but only appears to do so when fluid is flowing through the meter.

The inside diameter of site tube 22 varies with vertical position. The inside diameter is generally at its smallest at the bottom of site tube 22 proximate the flow inlet. The inside diameter of site tube 22 becomes larger toward the top of site tube 22 at the flow outlet. The arrows in site tube 22 indicate the direction of flow through site tube 22.

Float 10 is generally centered latitudinally within site tube 22 to move vertically along rod 24 when flow is introduced into the site tube. Float 10 rises and descends relative to the tube depending upon the flow rate of fluid through the tube. The greater the flow rate the higher float 10 rises within the tube.

To determine the flow rate through the meter, the height that float 10 rises within site tube 22 is calibrated to flow rate. An operator may look through site tube 22 to measure the height of float 10 within the site tube 22. The site tube may include markings along its length corresponding to various flow rates (not shown).

Figure 2:
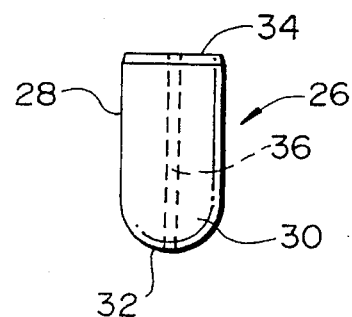
FIG. 2 is a side view of a float in accordance with the present invention.

FIG. 2 shows a float 26 in accordance with the present invention. Float 26 includes a body having a generally cylindrical portion 28 and a hemispherical portion 30 forming a leading end 32 opposite a trailing end 34. A guide rod opening 36 can be defined longitudinally through float 26 extending from leading end 32 to trailing end 34. Unlike float 10, float 26 is preferably entirely formed from a non-metallic material such as polytetraflouroethylene (PTFE).

In use, float 26 like float 10 may be mounted on guide rod 24 within site tube 22 to measure fluid flow rates through site tube 22. Float 26 will achieve a steady position within site tube 22 when upward fluid forces (drag) against float 26 are equal to the weight of float 26. As fluid flow rates increase, fluid speed through site tube 22 increases, upwardly directed drag forces on the float will exceed the weight of the float, causing it to rise in tube 22. Vertical displacement of the float will continue until the tube cross sectional area increases sufficiently, as the float rises, to lower the fluid speed and hence the upwardly directed drag forces incident the float. The float will then reestablish a stable position when the upward drag forces are equal to the weight of the float.

It can be appreciated that replacing a relatively heavy metallic float, such as float 10 with a relatively light non-metallic float within a given site tube could significantly change the flow rate measured. It may, however, be desirable to substitute a non-metallic float for a metallic float, if for example, flows of corrosive fluids are to measured. Since the non-metallic float is likely to be less dense and thus weigh less than the metallic float, within a given site tube a non-metallic float will measure a lower rate of flow than the heavier metallic float.

In accordance with the present invention, however, a method is provided to substitute a non-metallic float for a metallic float such that given a particular site tube, the non-metallic float will measure approximately the same flow rate as the metallic float when the non-metallic float rises to approximately the same height within the site tube as the metallic float at that flow rate. The method may also be used to provide a non-metallic float which can measure a range of flow rates similar to the range measured by the metallic float within a given site tube.

Figure 3:
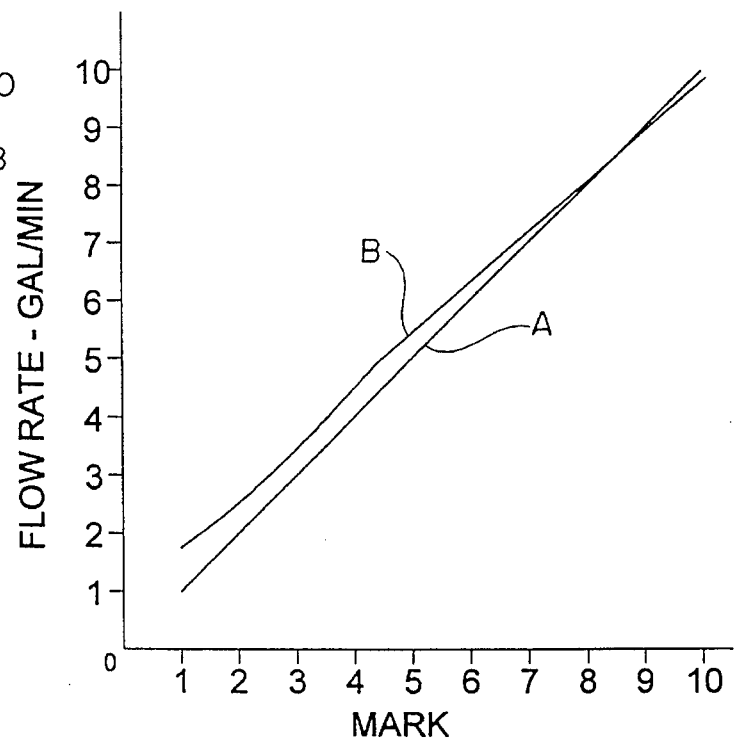
FIG. 3 is a graph comparing the flow rate versus height within the site tube for floats configured similarly to those of FIGS. 1 and 2.

FIG. 3 shows a graph of flow rate versus marks on a site tube. The zero mark is proximate the lower end of the site tube. Each successive mark up to ten is higher on the site tube. Curve A shows flow rate as a function of mark or height the float is at within a site tube for a float weighing 75 grams and configured similarly to float 10. Curve B shows the same relationship for a non-metallic float weighing 24 grams configured similarly to float 26. Both curves A and B were generated by testing the respective floats within the same site tube. As can be seen from the graph, although the float used to generate curve A weighs approximately 300 percent more than the float used to generate curve B, the measured flow rates are approximately the same for each float.

In order to achieve the results shown in FIG. 3, the method in accordance with the present invention has been developed. The method includes steps directed at varying the drag on the float and varying the float's weight.

Figure 4:
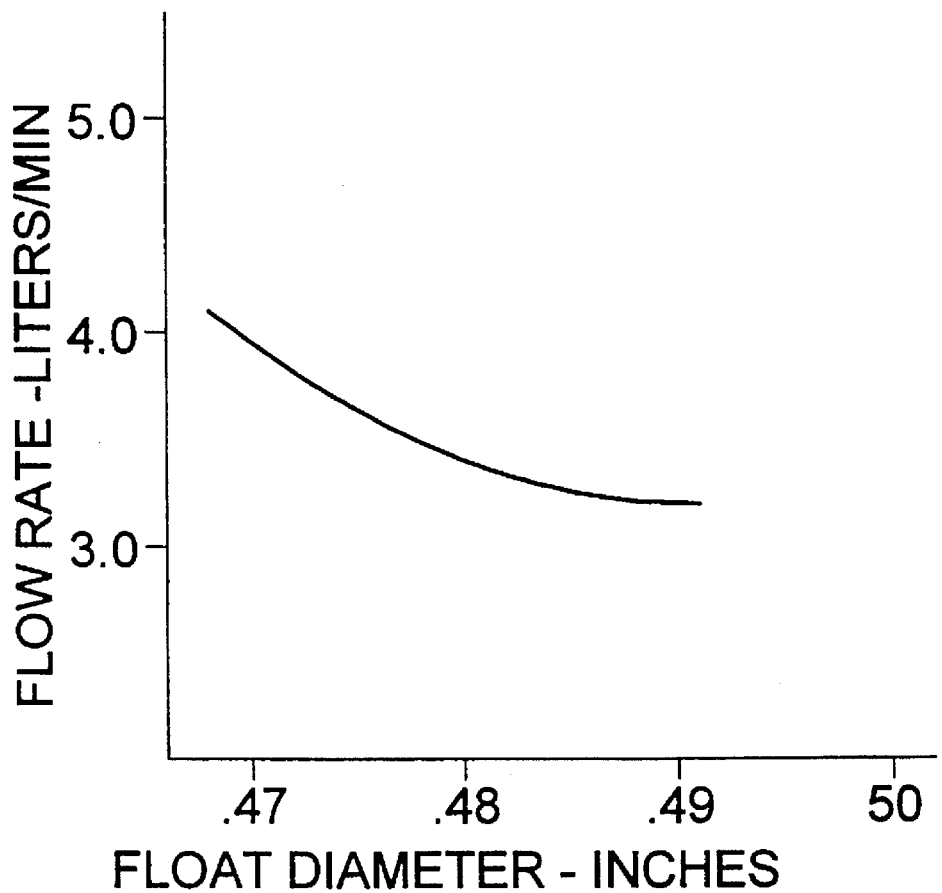
FIG. 4 is a graph showing the flow rate measured by a float at a given height within a site tube as a function of the float's diameter.

Drag may be reduced by forming a non-metallic float such as float 26 having a generally hemispherical portion 30 forming a leading end 32. Drag may also be reduced by reducing the diameter of cylindrical portion 28 of float 26. As float diameter decreases, less drag is exerted against the float in a given site tube. Drag increases, however, as float diameter increases. This relationship is demonstrated by FIG. 4. Where flow rate is plotted as a function of float diameter. As can be seen in FIG. 4, as float diameter increases, the flow rate measured at a given height of the float in the site tube decreases.

Figure 5:
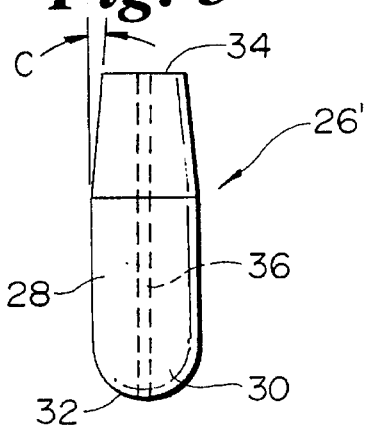
FIG. 5 is a side view of a non-metallic float in accordance with the present invention demonstrating boat tailing angle.
Figure 6:
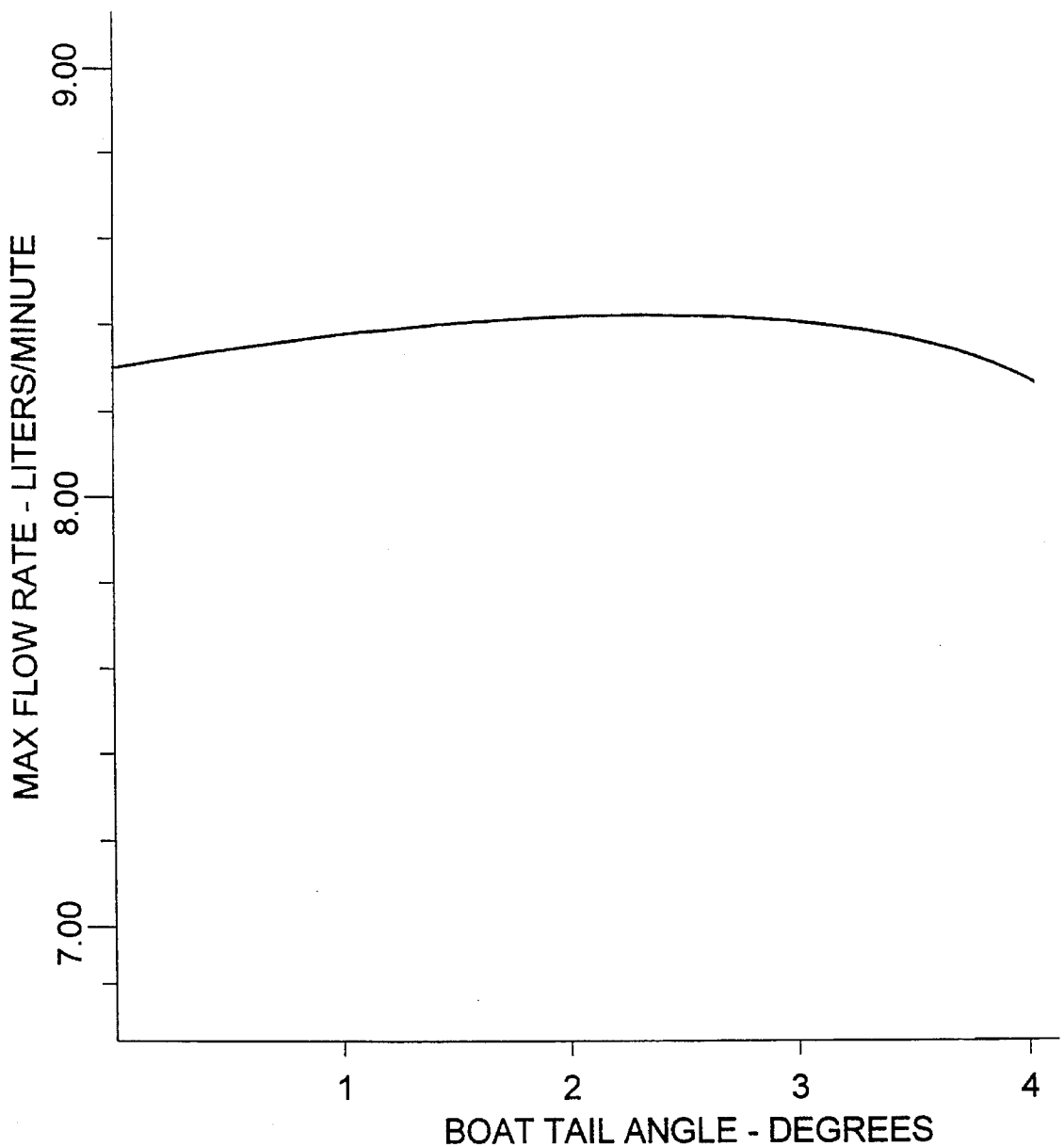
FIG. 6 is a graph showing the flow rate measured by a float at a given height within a site tube as a function of the boat tailing angle.

Boat tailing the trailing end of the float may also decrease drag. FIG. 5 shows float 26' having an extended boat tailed trailing end 34. The letter C indicates the boat tailing angle (it should be noted that float 26 is also shown as slightly boat tailed). FIG. 6 is a graph showing flow rate as a function of boat tailing angle, where the flow rate is measured when a float reaches the same height in the site tube. It can be appreciated that boat tailing can cause drag reduction or a drag increase. It is believed that boat tailing depends on two factors, boat tailing angle and the length of the boat tailed section of the trailing end. As can be seen in FIG. 6, drag reduction begins to occur when boat tailing angle 6 is approximately 3 degrees or less. The particular boat tailing angle at which drag reduction occurs is believed to depend on the type of fluid. Higher angles such as 45 degrees can be used when higher drag is needed to measure lower flow rates.

Figure 7:
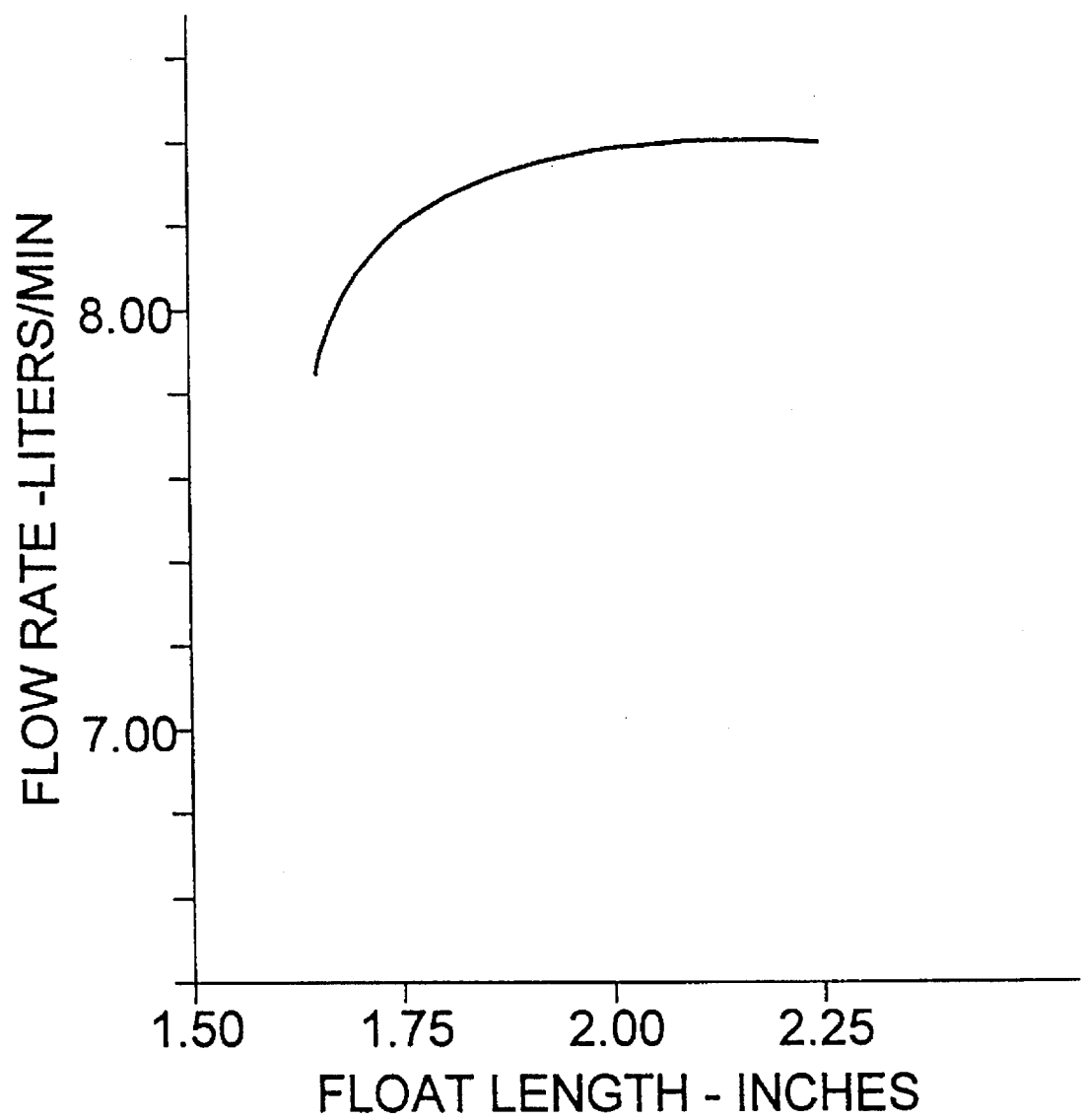
FIG. 7 is a graph showing the flow rate measured by a float at a given height within a site tube as a function of the float's length.

The weight of the float may be varied by varying the dimensions of the float. For example, FIG. 7 shows a graph of flow rate versus float length. As can be seen, increasing the float length and consequently the float's weight allows measurement of a higher flow rate when a float is at a particular height within a given site tube. The diameter of the float may also be adjusted to change the float's weight.

It can be appreciated that balancing the several parameters described above may be necessary in order to achieve the desired flow rate measurement. In some cases, it may be necessary to apply all of the steps referred to above or only one or more of them.

The steps described above may also be employed to provide another method in accordance with the present invention for substituting different floats within a given site tube to measure different flow rates or ranges of flow rates. One, several, or all of the steps described above could be used to configure a second float which could be used within a given site tube to measure a different flow rate than a first float when the second float is at the same level within the site tube as the first float. For example, the second float could measure a higher flow rate at that level in the site tube, by increasing its weight by lengthening the float. Alternately, the second float could measure a lower flow rate than the first float by increasing the drag, by, for example, not providing boat tailing.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A float mountable on a guide rod in a generally vertically-oriented flow meter site tube for limited movement along the guide rod to reflect volumetric fluid flow through the site tube as measured by a longitudinal position along the guide rod achieved by the float in response to the degree of flow through the site tube, comprising:

a non-metallic body including:

(a) a cylindrical portion having a leading end and a trailing end;

(b) a hemispherical portion, integral with said cylindrical portion, extending from said leading end of said cylindrical portion concentrically therewith, said hemispherical portion having a diameter substantially the same as a diameter of said cylindrical portion; and (c) a boat tailed portion, integral with said cylindrical portion, and extending from said trailing end of said cylindrical portion concentrically therewith, said boat tailed portion having a large diameter substantially the same as the diameter of said cylindrical portion and a small diameter;

wherein volumetric fluid flow rates through a similarly-sized site tube, comparable to rates measurable by at least partially metallic, heavier floats of a size similar to said float having said non-metallic body, can be measured by said float having said non-metallic body in view of variations of drag induced because of said hemispherical portion and said boat tailed portion of said non-metallic body.

2. A float in accordance with claim 1 wherein said non-metallic body is made from polytetrafluoroethylene.

3. A float in accordance with claim 1 wherein said non-metallic body defines a guide rod opening extending from said hemispherical portion to said boat tailed portion, wherein means for mounting said non-metallic body float to the guide rod are provided.

* * * * *